Patented June 16, 1931

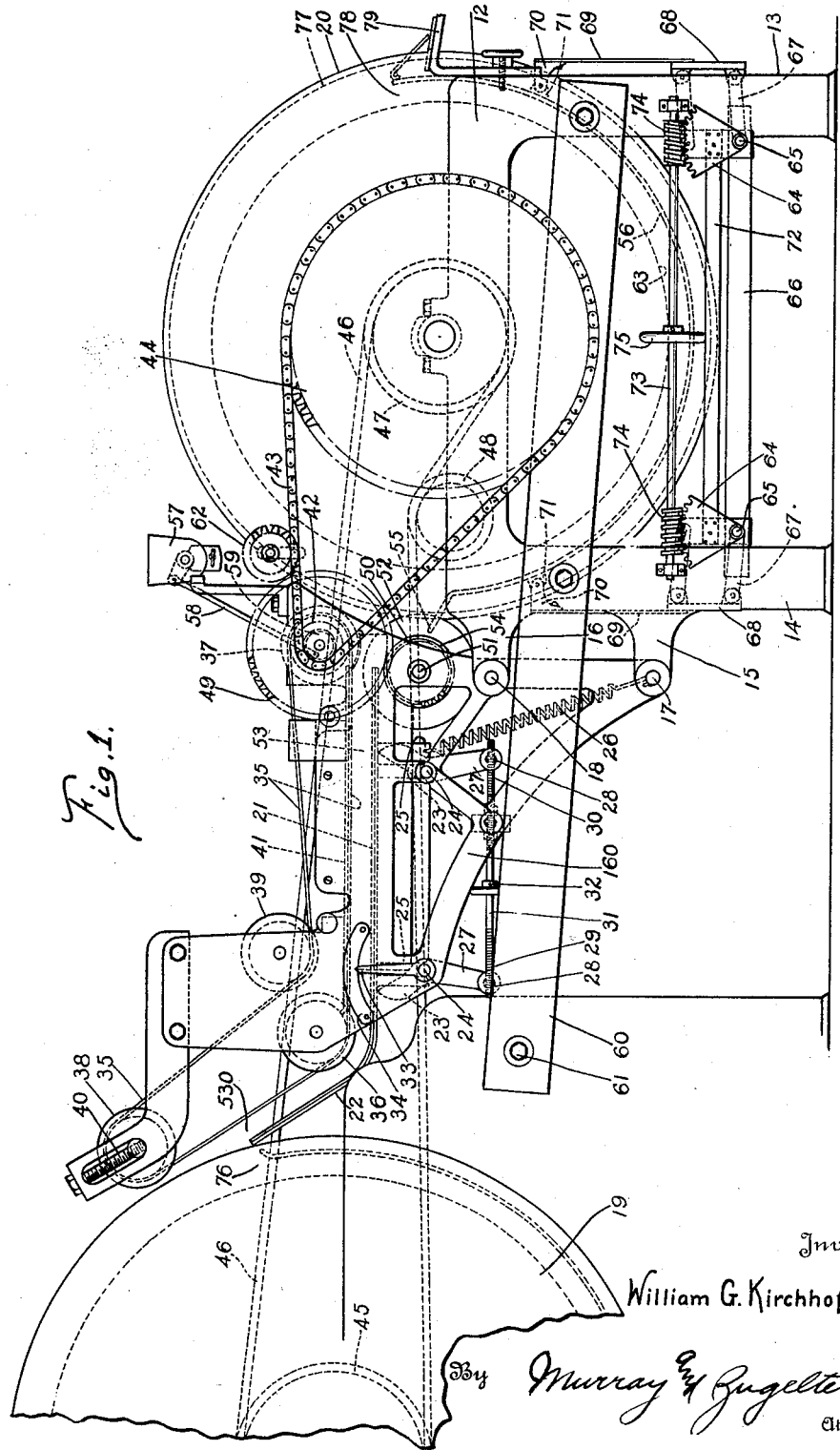

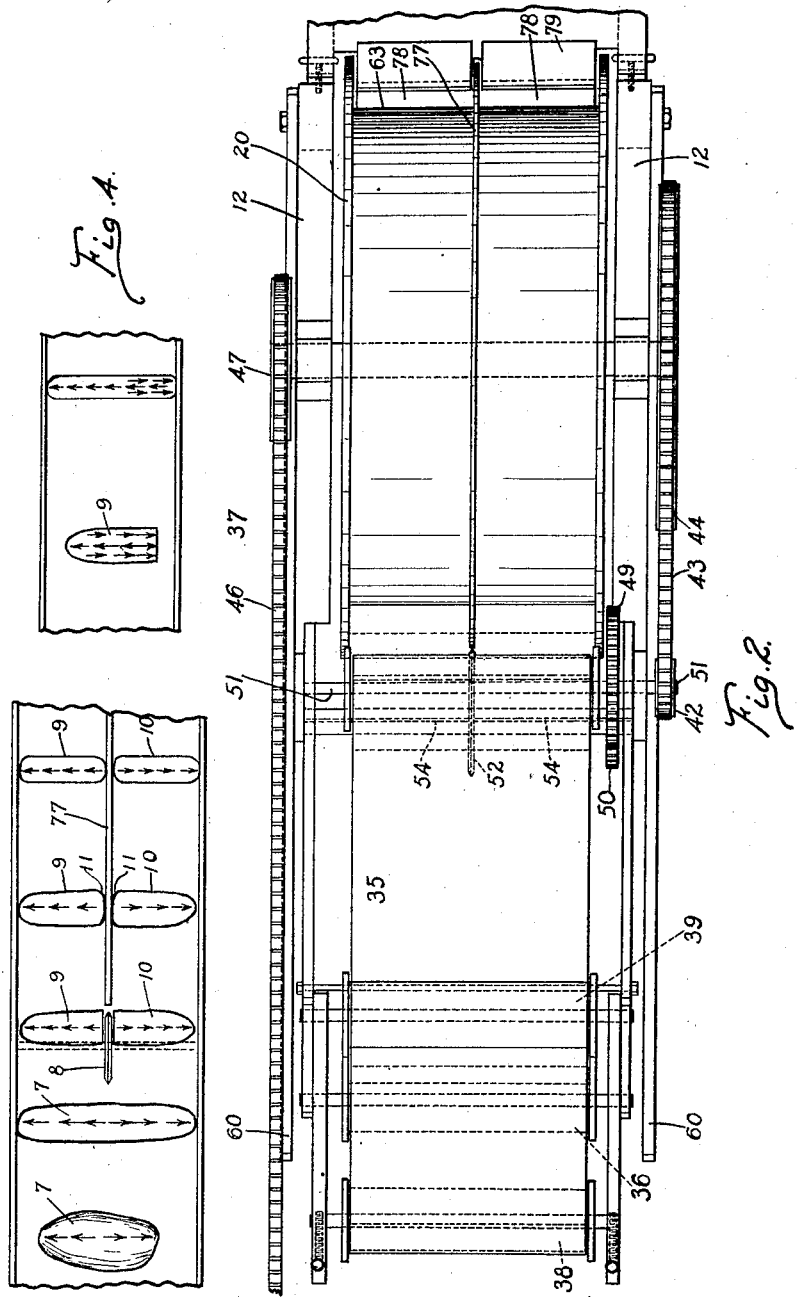

1,810,139

UNITED STATES PATENT OFFICE

WILLIAM G. KIRCHHOFF, OF CINCINNATI, OHIO, ASSIGNOR TO THE J. H. DAY COMPANY, OF CINCINNATI, OHIO, A CORPORATION OF OHIO

DOUGH MOLDER

Application filed July 31, 1925. Serial No. 47,215.

This invention relates to molders for plastics such as dough and has for an object the provision of a device for increasing the rate of production of bread and similar goods.

Another object is to provide a device of this kind which is simple in structure and operation.

Another object is to provide a device of this kind in which the grain of dough molded therein is not impaired by being stretched in opposite directions at any given place.

These and other objects are attained by the means described herein and disclosed in the accompanying drawings, in which:

Fig. 1 is a side elevational view of a device of my invention.

Fig. 2 is a plan view of the device shown in Fig. 1.

Fig. 3 is a view showing diagramatically the stretching movement of dough as it occurs in my device. A modified form of the device is also shown in this view.

Fig. 4 is a view of like character showing the resultant movement of dough in devices heretofore used for the same purpose.

In employing dough molders in the preparation of bread and similar other goods, it has heretofore been the practice to knead and mold comparatively large masses of dough after which the large mass was cut into a number of units to be baked. The severed portions of such units had what is commonly called "bleeding" ends or surfaces which required some additional work in order to seal the so called bleeding ends. In production methods of handling dough, this additional kneading was accomplished by taking the units which had been severed from the large mass and passing them through a second molding machine. As shown in Figs. 3 and 4 a mass of dough such as 7 was placed into a molder and subsequently rolled and stretched either between belts and pressure boards or drums and pressure boards so that the stretching action took place from the center toward the ends as indicated at the left of Fig. 3. The large mass thus kneaded was cut by a suitable knife such as indicated at 8 so that the mass 7 was divided for example, into two units 9 and 10. By methods known heretofore a unit such as 9 would be passed, by means of a suitable conveyor to a second molder into which it would pass at random and be again stretched. The stretching action in this case would again take place from the center toward the opposite ends. However, the entire mass 9 had in the first instance been stretched from the severed edge 11 toward its opposite end and the subsequent molding, as shown in Fig. 4, accomplished a stretching of at least one-half of the unit 9 in the direction opposite to that which took place while the unit 9 was a component part with the mass 7. This opposite stretching of the dough naturally affected the quality or grain of the dough so that while this method has heretofore been very effective in increasing the rate of production of molded dough products, such speed has been attained at the sacrifice of quality of the resultant product. In the device of my invention, the units 9 and 10 which have been severed by the cutting means such as 8 are passed immediately into separate ways in a multiple loaf molder so that the bleeding edges 11 are kept in abutment with a suitable side wall structure of the molder so that any subsequent stretching which may take place will be in the same direction as occurred prior to the cutting. The device of my invention therefore neatly seals up the bleeding edges 11 and effects the proper forming of the units without disturbing the grain of such units so that by use of my device I have been able to acquire the same or possibly greater speed of production without sacrificing the quality of the resultant product.

The device of my invention comprises a bed composed of side members 12 carried by suitable legs or uprights 13 and 14. The members 14 are provided with frame support extensions 15 and 16 which are preferably integral with the leg member 14. A pair of substantially triangular frames 160 are secured upon extensions 15 and 16 by means of support rods 17 and 18 extending through aligned perforations in the frames and extensions 15 and 16. The pair of triangular frames 160 are adapted to support between them substantially all of the mechanism for receiving a mass of dough from a primary molder 19 and rolling and stretching said mass to the proper length and diameter, and cutting the molded mass into units and to deliver them without disturbing their positions to the molder drum 20 forming a part of my device. A pressure board 21 is provided with an angularly disposed portion 22 and the entire structure is preferably covered with canvas or the like. The pressure board 21 is supported upon cams 23 which may be moved about their pivotal mountings on cross rods 24 supported by the frame 160 for effecting vertical movement of the pressure board. The pressure board is supplied with slotted lugs 25 which seat over the cross rods 24 and retain the pressure board against longitudinal movement and spring 26 has its one end hooked upon one of the lugs 25 and its other end suitably secured to any part of the frame structure such as support rod 17. The spring 26 exerts a downward pressure intermediate the points of contact of cams 23 upon the pressure board and resists tilting of said pressure board about either of the cams 23. The cams 23 are provided with integral pressure board adjusting forks 27, the free ends of which carry freely revoluble cross rods 28. The cams 23 operate in pairs on each longitudinal side of the device and the revoluble cross rods 28 are provided with threaded bores for receiving oppositedly threaded ends 29 and 30 of an adjusting rod 31. The rod 31 may be turned by means of a hand wheel 32 so that the cams 23 may be raised or lowered for effecting vertical adjustment of the pressure board 21. Suitable indicators 33 and indicator plates 34 are mounted upon the cams 23 and frames 160 respectively so that a uniform adjustment of the pressure board may be made at each side of the machine. A conveyor belt 35 is suitably supported upon the conveyor rolls 36, 37, 38 and 39 so that its lower face may be retained in parallelism with the pressure board 21 and its angularly disposed portion 22. A suitable conveyor belt tightener 40 provides means for retaining the conveyor belt 35 tightly upon the conveyor rolls. The rolls 36, 37, 38 and 39 are revolubly supported between the support brackets 160 which brackets also carry an upper pressure board 41 which precludes the conveyor belt 35 from being moved out of parallelism with the pressure board 21 as a mass of dough passes between the pressure board 21 and said belt. The conveyor roll 37 serves as a drive roll for the conveyor belt and is actuated through sprocket 42 and chain 43 driven from a sprocket 44 carried by the drum 20. The drum 20 is in turn driven from a suitable sprocket 45 on the primary molder 19 by means of a chain 46 passing about a second sprocket 47 on the drum 20 and an idler sprocket 48 revolubly mounted upon the frame 12. The drive roll 37 also carries a gear 49 which meshes with gear 50 secured to knife roll shaft 51. A circular knife 52 is secured to knife roll shaft 51 and is positioned centrally of the pressure board with its blade passing through a convenient slot in the end of the pressure board 21 so that the cutting edge of the knife extends into the space or way 53 between said pressure board and the conveyor belt. Mounted upon the knife roll shaft 51 on each side of the knife 52 are knife rolls 54, the peripheries of which pass adjacent a lip 55 of an adjustable pressure board 56 mounted concentrically with the drum 20. The knife 52 extends into a slit in the lip 55. A flouring device 57 which may be of an oscillating type is conveniently actuated by a link 58 having an end eccentrically mounted on a suitable collar 59 secured upon the shaft of the drive roll 37. A pair of connecting links 60 are secured upon legs 13 and 14 and have their ends projecting outwardly so that the molder of my invention may be conveniently coupled to any suitable primary molder such as 19 by merely inserting bolts 61 through the links and into the frame of such primary molder. The idler sprocket 48 serves to hold the drive chain 46 so that the device may be conveniently driven from the primary molder such as 19 by means of the chain 46. An idler sprocket 62 serves as an adjustment for tightening the chain 43 which drives the conveyor drive roll from sprocket 44 on the molder.

The arcuate pressure board 56 is mounted for adjustment toward and away from the periphery 63 of the molder drum 20 by means of a pair of toothed segments 64 fixedly mounted on shafts 65 which are rotatably mounted in cross members 66. Links 67 are rigidly secured to the shafts 65 at their one end and their free ends are pivotally mounted to bars 68 which in turn carry spring steel support arms 69 having brackets 70 to which lugs 71 on the pressure board 56 are pivotally mounted. The bars 68 also have a second pair of pivotally mounted lugs 71 attached thereto and the free ends of these lugs are pivotally mounted upon a convenient strut 72. A shaft 73 revolubly mounted upon legs 13 and 14 carries worms 74 and may be actuated by a suitable hand wheel 75 for moving the segments 64 about their pivotal mounting. The movement of the segment is translated into vertical movement of the bars 68 and spring steel supporting arms 69 so that the pressure board may be moved toward and away from the periphery 63 of the drum and will always be concentric thereto.

The operation of the device is as follows:

Masses of dough such as 7 are kneaded and stretched into a mass such as is shown in Fig. 3 by being passed through a primary molder of any suitable type such as 19. The primary molder 19 discharges the mass 7 at 76 where said mass will pass into the way 530 which is the angularly disposed continuation of the way 53 between conveyor belt 35 and the angularly disposed portion 22 of the pressure board 21. The various mechanisms heretofore described being actuated through the chain 46, the conveyor belt 35 will move the mass of dough 7 downwardly through the angularly disposed way 530 at the same time rolling and stretching it. The pressure board 21 having been adjusted to the proper spaced relation with the upper pressure board 41 will continue to stretch and roll the dough until said roll assumes a diameter substantially equal to the distance between the belt and pressure board. During the movement of dough over the end 22 of the pressure board, the spring 26 yieldingly resists tilting of the pressure board out of its normal position. As the dough passes along through the way 53 it is molded to substantially the shape desired whereupon it reaches the revolving knife 52 where the molded mass 7 is cut into two portions 9 and 10 (see Fig. 3) and each of these portions passes over the knife rolls 54 onto the outwardly extending lip 55 on the pressure board 56, of the drum molder 20. The periphery 63 of the drum molder 20 is provided with a central upstanding flange 77 which flange rotates in actual alignment with the knife 52 so that as the units 9 and 10 leave the knife rolls 54 and knife 52, the bleeding ends of severed portion 11 of the units of dough 9 and 10 are carried forward and remain in abutment with opposite sides of the upstanding peripheral flange 77. The duster 57 discharges its flour about the lip 55 of the pressure board 56 and units 9 and 10 suitably dusted pass downwardly between the periphery 63 of the drum and the pressure board 56 which has been suitably positioned in relation thereto. The units of dough 9 and 10 are then rolled and stretched as the rotation of the drum molder carries them between its periphery and the pressure board and any further stretching of the dough in the units 9 and 10 which may take place will occur in the same direction as it did when said dough was passing through the primary molder 19, this action being shown in Fig. 3 of the drawings. The completely molded units 9 and 10 having the bleeding ends properly sealed are then discharged at 78 onto a suitable table or other receiving means 79 of the device. As previously explained the device may be used in connection with any of a number of types of primary molders, the device of the invention being very readily attached and detached from such primary molder by means of the connecting links 60. It will be apparent to those conversant with the art, that the use of drum type molders is of course preferable where floor space is limited. However, where space is not limited, the structure may be modified as shown in Fig. 3 so that the drum type molders may be eliminated and an extended form of horizontal pressure boards and separating conveyor belts may be used. In this form, as shown in Fig. 3, the cutter may be disposed at a point intermediate the ends of the pressure board and a straight flange 77 may be placed in alignment with the knife thereby effecting the results heretofore described. It will also be readily apparent to those conversant with the art, that the knife and flange in alignment therewith may be embedded directly in a drum type molder.

What I claim is:

1. In a device of the class described the combination of a pressure board, a conveyor belt mounted for movement in substantial parallelism with the pressure board, cutter means disposed in alignment with the pressure board and extending into a space between the pressure board and conveyor belt, and a drum molder having a peripheral flange extending in alignment with the cutter means whereby a mass of dough severed by the cutting means may have its severed portions pass directly from the cutter means into abutment with the peripheral flange.

2. In a device of the class described the combination with a pressure board and a conveyor adapted to receive a mass of dough therebetween for rolling, kneading and stretching said mass of dough upon movement of the conveyor, of cutter means mounted in the path through which the dough moves, and a molder having a flange in alignment with the cutter means for receiving dough as it is severed by the cutter means.

3. In a device of the class described the combination with a rotatably supported drum having a central peripheral flange extending therefrom, of an arcuate pressure board positionable relative to the drum, a pair of substantially triangular brackets extending forwardly of the drum, cam members supported by the brackets, a pressure board supported by the cams and adapted to be raised and lowered by movement thereof, a conveyor belt mounted for movement in substantial parallelism with the last mentioned pressure board and forming between itself and said pressure board a way through which dough may be rolled and moved, cutter means mounted intermediate an end of the last mentioned pressure board and the central peripheral flange on the drum, and means for effecting movement of the drum, conveyor belt and cutter means whereby dough may be moved through the way and be severed by the cutter means and carried from the cutter means into abutment with the flange on the drum whereupon further movement of the drum will seal the severed edges of the dough and roll said severed portions of dough between itself and the arcuate pressure board.

4. In a device of the class described the combination with means for rolling a mass of dough whereby the dough is stretched from the center of the mass toward the ends thereof, of means comprising a pressure board and conveyor belt for shaping and further stretching the roll of dough, means for cutting the roll of dough at its longitudinal center, and means in alignment with the cutting means for receiving the cut edges of the roll in abutment therewith and for rolling said severed portions of the roll for sealing the cut ends in such manner as to assure stretching of the dough only in the line of its original stretching movement.

5. In a device of the class described the combination of a primary molder for rolling and stretching a mass of dough from its center toward its opposite ends, a pressure board mounted adjacent the primary molder for receiving the rolled mass of dough therefrom, a conveyor belt mounted for movement in substantial parallelism with the pressure board and adapted to cooperate with said board in effecting further stretching of the roll of dough from its center toward its opposite ends as the belt moves the roll over the board, cutter means mounted centrally of the path of the roll of dough for severing the roll of dough midway between its ends whereby two units are formed, each of which has previously been stretched only in a direction extending from its newly severed end to its opposite end, and a secondary molder having a central flange against which the severed end of the units abut as they pass from the cutter means, the secondary molder serving to seal the severed end of each unit and to effect further stretching thereof only in a direction away from said severed end.

6. In combination, a primary molder, a secondary molder, means to receive dough from the primary molder and to roll and move said dough to the secondary molder, a cutter mounted between the primary and the secondary molders for cutting the roll of dough as it moves to the secondary molder, and means comprising rollers adjacent the cutter and a flange on the secondary molder for positioning the severed pieces of dough so that the secondary molder may seal the cut ends of the pieces and effect stretching thereof only in a direction away from the severed ends.

7. In a device of the class described the combination with molding means for stretching a roll of dough from its center toward its ends, conveying means for receiving said roll and effecting like stretching thereof, means for cutting the roll through its center, and a secondary molder having a flange in alignment with the cutter means for receiving the severed ends of the roll in sliding abutment whereby the severed portions of the roll may be precluded from stretching at their severed ends as the secondary molder completes molding and forming of the portions of dough.

8. In a device of the class described the combination with means for molding a mass of dough for elongating the mass by stretching the mass of dough from its longitudinal center towards its ends, means for severing the mass at its longitudinal center, and means comprising a secondary molder with a limiting flange terminating immediately adjacent and in alignment with the severing means for sealing the severed ends of the sections, for continuing the molding of the sections and continuing the stretching of the sections in the same directions in which the unsevered ends were stretched, and precluding the severed ends stretching toward one another.

In testimony whereof, I have hereunto subscribed my name this 25th day of July, 1925.

WILLIAM G. KIRCHHOFF.